(12) United States Patent
Martin

(10) Patent No.: US 11,594,071 B2
(45) Date of Patent: Feb. 28, 2023

(54) METHOD FOR SIMULATING THE REALISTIC RENDERING OF A MAKEUP PRODUCT

(71) Applicant: CHANEL PARFUMS BEAUTE, Neuilly sur Seine (FR)

(72) Inventor: Victor Martin, Pantin (FR)

(73) Assignee: CHANEL PARFUMS BEAUTE, Neuilly sur Seine (FR)

( * ) Notice: Subject to any disclaimer, the term of this patent is extended or adjusted under 35 U.S.C. 154(b) by 630 days.

(21) Appl. No.: 16/699,800

(22) Filed: Dec. 2, 2019

(65) Prior Publication Data

US 2020/0170383 A1 Jun. 4, 2020

(30) Foreign Application Priority Data

Dec. 3, 2018 (EP) .................................... 18306600

(51) Int. Cl.
G06V 40/16 (2022.01)
G06V 10/56 (2022.01)

(52) U.S. Cl.
CPC ............ G06V 40/167 (2022.01); G06V 10/56 (2022.01); G06V 40/169 (2022.01); G06V 40/171 (2022.01)

(58) Field of Classification Search
CPC .... G06V 40/167; G06V 10/56; G06V 40/169; G06V 40/171; A45D 44/005;
(Continued)

(56) References Cited

U.S. PATENT DOCUMENTS 6,502,583 B1 1/2003 Utsugi
9,750,326 B2 9/2017 Yoshida et al.
(Continued)

FOREIGN PATENT DOCUMENTS

JP 2004-506996 A 3/2004
JP 2005-293231 A 10/2005
(Continued)

OTHER PUBLICATIONS

Kristina Scherbaum et al. "Computer-Suggested Facial Makeup", Computer Graphics Forum, vol. 30, No. 2, Apr. 2011, pp. 485-492. (Year: 2011).*
(Continued)

*Primary Examiner* — Ali Bayat
(74) *Attorney, Agent, or Firm* — Nixon & Vanderhye

(57) ABSTRACT

Disclosed is a method for simulating the rendering of a make-up product on the face of a subject, using a database of reference images including, for each reference individual, images of the face with and without the makeup product. The method includes: acquiring an image of the subject face without makeup; processing the image to extract, for each spatial area of each spatial frequency range of the image, first color feature values of the spatial area; determining, among the database of reference images, reference individuals having, when wearing no makeup, color feature values similar to the first color feature values of the subject; determining, from the first color feature values of the subject, and from color feature values of the reference individuals with and without the makeup product, second color feature values; and generating a modified image of the subject face based on the second color feature values.

14 Claims, 5 Drawing Sheets

(58) Field of Classification Search
CPC .... A45D 2044/007; G06T 2207/30201; G06T 11/00; G06T 7/90; G06T 15/205; G10L 15/08
USPC .......................................................... 382/164
See application file for complete search history.

(56) References Cited

U.S. PATENT DOCUMENTS

| | | | |
|---|---|---|---|
| 10,028,569 | B2 | 7/2018 | Yamanashi et al. |
| 11,145,091 | B2* | 10/2021 | Nishi ........................ G06T 11/60 |
| 11,257,142 | B2* | 2/2022 | Yeh ..................... G06Q 30/0641 |
| 11,315,173 | B2* | 4/2022 | Sartori Odizzio .. G06F 3/04845 |
| 2017/0185824 | A1* | 6/2017 | Cheng ....................... G09B 5/02 |
| 2019/0042835 | A1* | 2/2019 | Mostafa .................. G06F 21/32 |
| 2019/0098149 | A1* | 3/2019 | Shinoda ................. A45D 33/38 |
| 2019/0214127 | A1* | 7/2019 | Hu ........................ G06T 7/0016 |

FOREIGN PATENT DOCUMENTS

| | | |
|---|---|---|
| JP | 2014-217456 A | 11/2014 |
| JP | 2017-123015 A | 7/2017 |
| KR | 10-0407111 B1 | 11/2003 |
| KR | 10-2009-0087679 A | 8/2009 |
| KR | 10-1713086 B1 | 3/2017 |
| WO | 98/39735 A1 | 9/1998 |
| WO | 02/17234 A1 | 2/2002 |

OTHER PUBLICATIONS

Office Action issued in Japanese Patent Application No. 2019-202054 dated Mar. 2, 2021.
Office Action issued in Korean Patent Application No. 10-2019-0158100 dated Feb. 10, 2021.
Scherbaum et al., "Computer-Suggested Facial Makeup", Computer Graphic Forum, 2007, pp. 485-492, vol. 30, No. 2, XP055539179.
Tong et al., "Example-Based Cosmetic Transfer", Computer Graphics and Applications, 15th Pacific Conference on Computer Graphics and Applications, IEEE Computer Society, 2007, pp. 211-218, XP055562734.
Goshtasby et al., "Piecewise Linear Mapping Functions for Image Registration", Pattern Rocognition, 1986, pp. 459-466, vol. 19, No. 6.
EP Search Report, dated Feb. 27, 2019, from corresponding EP application No. 18306600.0.
Yamagishi et al., "Cosmetic Features Extraction by a Single Image Makeup Decomposition", The IEEE Conference on Computer Vision and Pattern Recognition (CVPR) Workshops, 2018.

* cited by examiner

METHOD FOR SIMULATING THE REALISTIC RENDERING OF A MAKEUP PRODUCT

FIELD OF THE INVENTION

The invention relates to a method for simulating the rendering of a makeup product on an image of the face of a subject, and to a system for implementing said method. The invention is particularly suitable for simulating the rendering of foundation makeup products.

TECHNICAL BACKGROUND

The choice of a foundation adapted to one's carnation is always difficult, because of several issues. First, the color of the foundation once applied on the skin of the person is different from the color of the bulk foundation product. It is in fact different from one person to another, according to the skin color of the person. Second, it is also difficult for a person to know exactly its skin color and to choose which foundation is most appropriate. In order to circumvent this problem, solutions have already been proposed for simulating the rendering of a foundation on an image of the face of a subject. In this type of solution, the simulation of the rendering on the image results from the application of predefined rules that are set by the developer of the simulation algorithm, and validated by a makeup expert. These predefined rules are for instance rules for computing color parameters of the image simulating the rendering of the foundation, from the color parameters of the bulk foundation product.

A drawback of this type of solution is that the rendering of the makeup product does not depend upon the color of the skin of the subject, so the simulated rendering cannot be fully realistic.

More generally, the predefined rules which are established in this type of solution are based on a limited amount of parameters, and do not take into account all the specificities of the skin, which can impact the rendering.

Therefore users of this type of solution can be disappointed when comparing the simulation of the rendering of the foundation with its actual rendering, once applied on the skin.

Methods for simulating the rendering of a make-up product on an image are known from "Computer-Suggested Facial Makeup" of Kristina Scherbaum et al., Computer Graphic Forum, vol 30, n° 2, pages 485-492 (2007); "Example-Based Cosmetic transfer" of Wai-Shun Tong et al., 15$^{th}$ Pacific Conference of Computer Graphics and Applications, pages 211-218 (2011).

PRESENTATION OF THE INVENTION

In view of the above, the invention aims at providing a more realistic method for simulating the rendering of a makeup product on an image of the face of a subject.

In particular, one aim of the invention is to take into account the color of the skin of the subject in the simulation of the rendering.

Another aim of the invention is to take into account other skin information that color in order to simulate the rendering, such as high frequency details.

Another aim of the invention is to be based on actual data, i.e. on actual images of rendering of makeup products on people.

To this end, a method for simulating the rendering of a make-up product on an image of the face of a subject is disclosed, the method being implemented by a system comprising a computer and a memory storing a database of reference images comprising, for each of a plurality of reference individuals, an image of the face of the reference individual devoid of makeup and an image of the face of the same reference individual madeup with the makeup product, the method comprising the steps of:

a. acquiring an image of the face of the subject devoid of makeup,
b. processing the image to extract, for each of a plurality of spatial areas of each of a plurality of frequency ranges of the image, first color feature values of the spatial area,
c. determining, among the database of reference images, a set of reference individuals having, when wearing no makeup, color feature values similar to the first feature values of the subject,
d. determining, from the first color feature values of the subject, and from color feature values of the set of reference individuals with and without the makeup product, second color feature values, and
e. generating a modified image of the face of the subject based on the second color feature values.

In embodiments, step b. comprises:
decomposing the image of the face of the subject into a plurality of frequency ranges, to obtain a plurality of secondary images wherein each secondary image corresponds to one of the frequency ranges,
performing a spatial decomposition on each of the plurality of secondary images to obtain, for each secondary image, a plurality of spatial areas, and
extracting the first color feature values of each spatial area of each secondary image.

In embodiments, the decomposition of the image of the face into a plurality of frequency ranges is performed by difference of Gaussians.

In embodiments, each image comprises a plurality of pixels having color parameters, and the color feature values of a spatial area comprise an average value and a standard deviation of each color parameters of the pixels of the spatial area.

In embodiments, step e. comprises modifying the color parameters of each spatial area of each frequency range so that each spatial area of each frequency range exhibits the second color feature values, and replacing the color parameters of the pixels of the image of the subject by the sum of the modified color parameters over all the frequency ranges.

In embodiments, wherein each image of the database is associated with color feature values determined by implementing, on the image, the processing of step b., and step c. comprises computing a distance between the first color feature values of the subject and the color feature values of each image of a reference individual devoid of makeup, and selecting the reference individuals of the set as having the smallest computed distance with the subject.

Step c. may then further comprise a preliminary step of associating color feature values to each image of the database by implementing, on the image, the processing of step b.

In an embodiment, step d. may comprise expressing the first feature values of the subject as a centroid of the feature values of the set of reference individuals without makeup, and determining the second feature values as the same centroid of the feature values of the set of reference individuals wearing the makeup.

In embodiments, the method comprises a step prior to step b. of warping the acquired image of the face of the subject into a mean shape, and a step following step e. of warping the generated modified image back to the initial shape of the face of the subject.

According to another object, a computer program-product is disclosed, comprising code instructions for the implementation of the method according to the above description, when implemented by a computer.

According to another object, a system for simulating the rendering of a makeup product on an image of the face of a subject is disclosed, comprising a computer and a memory storing a database of reference images comprising, for each of a plurality of reference individuals, an image of the face of the reference individual devoid of makeup and an image of the face of the same reference individual madeup with the makeup product, the system being configured for implementing the method according to the above description.

A method for building a database of reference images is also disclosed, the method being implemented by a computer and comprising:
- acquiring, for each of a plurality of reference individual, an image of the face of the reference individual devoid of makeup and an image of the face of the same reference individual madeup with the makeup product,
- processing each image to extract, for each of a plurality of spatial areas of each of a plurality of frequency ranges of the image, color feature values of the spatial area, and
- storing, in a memory, each image in association with the color feature values extracted from the image.

In embodiments of this method, the step of processing the image may comprise:
- decomposing the image of the face of the subject into a plurality of frequency ranges, to obtain a plurality of secondary images wherein each secondary image corresponds to one of the frequency ranges,
- performing a spatial decomposition on each of the plurality of secondary images to obtain, for each secondary image, a plurality of spatial areas, and
- extracting the first color feature values of each spatial area of each secondary image.

In embodiments, each image comprises a plurality of pixels having color parameters, and the color feature values of a spatial area comprise an average value and a standard deviation of each color parameters of the pixels of the spatial area.

Is also disclosed a computer program product comprising code instructions for the implementation of the method for building a database of reference images, when executed by a computer.

The method according to the invention allows a realistic simulation of the rendering of a makeup product, as it takes into account the color of the skin of the subject, and high frequency details such as the texture of the skin, thereby allowing the rendering of a same makeup product to be different for two different persons, and more realistic.

Moreover, the simulation of the rendering of the makeup product is also based on actual data, i.e. on actual images of the rendering of the makeup product on reference people. Therefore, all skin information is taken into account and the simulation provides better results.

DESCRIPTION OF THE DRAWINGS

Other features and advantages of the invention will be apparent from the following detailed description given by way of non-limiting example, with reference to the accompanying drawings, in which.

DETAILED DESCRIPTION OF AT LEAST AN EMBODIMENT OF THE INVENTION

Figure 1:
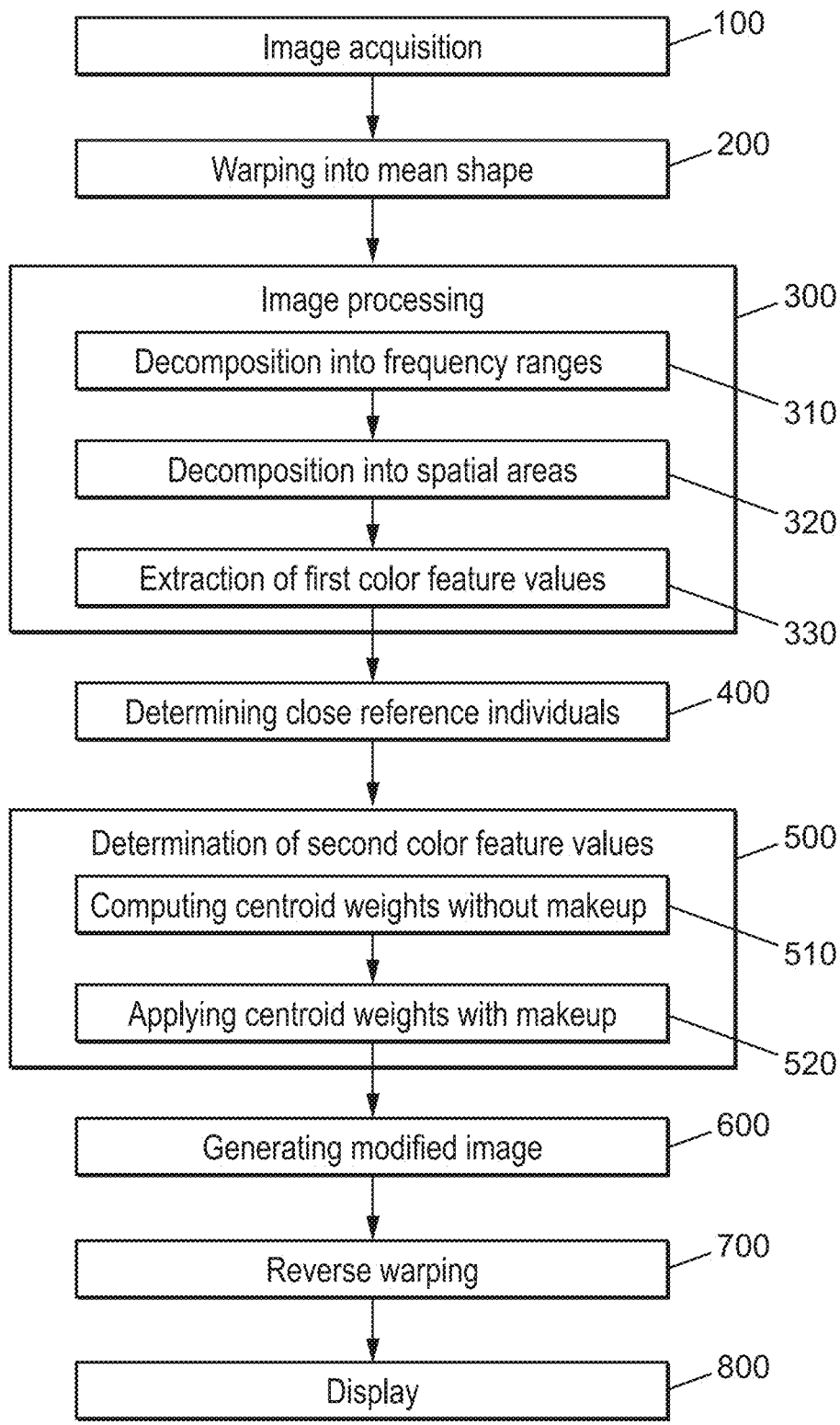
FIG. 1 schematically represents the main steps of a method of simulating the rendering of a make-up product according to an embodiment of the invention.

With reference to FIG. 1, the main steps of a method for simulating the rendering of a make-up product on an image of the face of a subject will now be described. This method is implemented by a system 1, schematically shown on FIGS. 2a and 2b, comprising at least a computer 10 and a memory 11 storing a database of reference images. Optionally, the system 1 may further comprise at least one camera 12 suitable to capture an image of the face of the subject, on which the rendering of the makeup product is then simulated. The system 1 preferably also comprises a display 13, able to display a modified image on which the rendering of the makeup product is simulated.

Figure 2A:
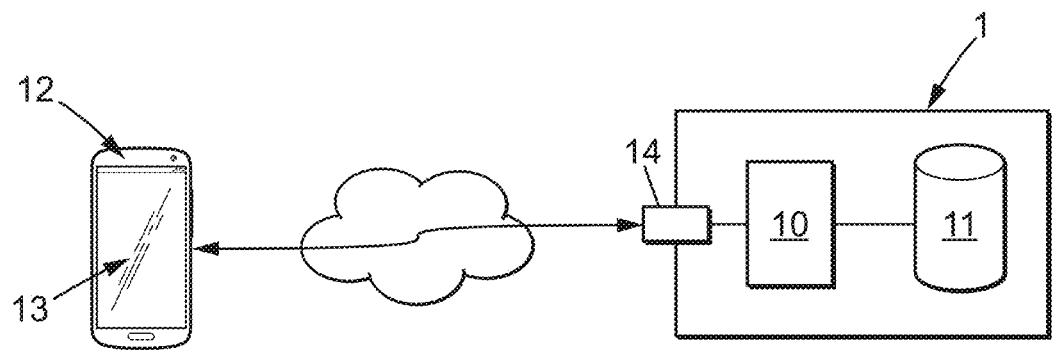
FIGS. 2a and 2b schematically represent examples of a system for implementing the method according to two embodiments.
Figure 2B:
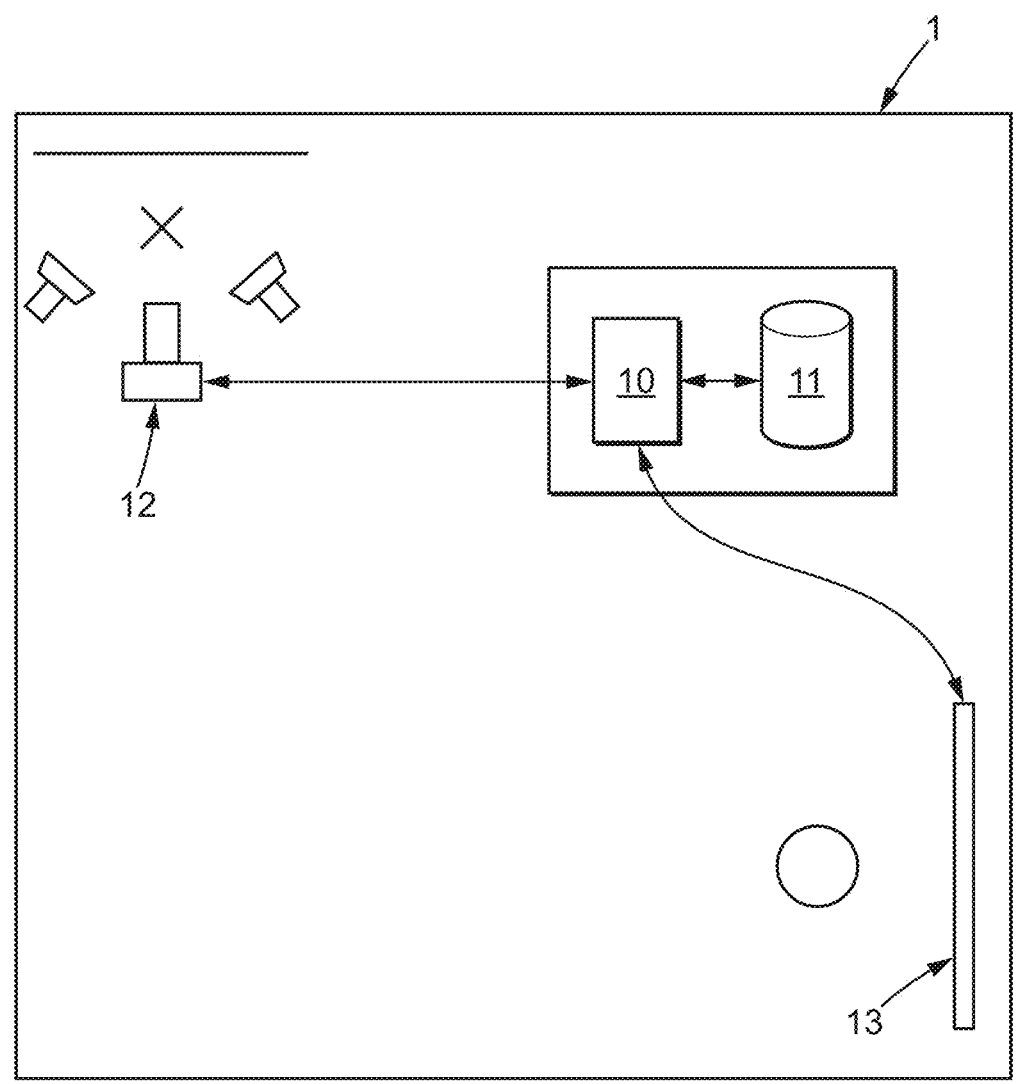

According to a first embodiment shown in FIG. 2a, the method is made available as a software application of a personal electronic device of a subject such as a smartphone or digital tablet. In that case the system 1 may comprise at least a connection interface 14 to a telecommunication network (Internet, 3G, 4G, etc.), making it able to communicate with the personal electronic device. The system 1 itself may not comprise a camera or display but rely upon the camera and display of the personal electronic device, as will be discussed in more details below. Alternatively, the system may be fully incorporated in the personal electronic device, with the database of reference images stored in a memory of the device, and the computer 10 being a component of the device such as a processor, microprocessor, etc.

According to another embodiment, the method can be implemented in a beauty salon or a shop. In this case the system may be physically installed within the premises of the beauty salon or shop, and comprise a screen 13 and a camera 12 located in the beauty salon or shop, as represented for example in FIG. 2b. Alternatively, the system 1 may be located remotely from the beauty salon or shop and comprise a connection interface 14 to a camera and display located in the beauty salon.

The database stored by the memory 11 comprises, for each of a plurality of reference individuals, one picture of the face of the reference individual with nude skin, i.e. devoid of any makeup product, and at least one picture of the face of the same individual, madeup with the makeup product which rendering has to be simulated. Preferably, the database comprises these pairs of images of a plurality of reference individuals, for each of a plurality of makeup products, in order to allow simulating the rendering of a plurality of makeup products.

Preferably, the makeup product which rendering is simulated is foundation. Alternatively, the makeup product may be eyeshadow, lipstick, or blush.

Back to FIG. 1, a first step 100 of the method is the acquisition of an image of the face of the subject wearing no make-up. If the system 1 comprises a camera, this step is preferably performed by the camera.

Alternatively, if for instance the method is made available as a software application of a personal electronic device such as a smartphone or digital tablet incorporating a camera, the capture of the picture may be made by the camera of the personal electronic device, and the picture may be then transmitted by the personal electronic device to the system 1. The acquisition step of the picture, performed by the system 1 comprising the computer 10 and the memory 11, is in that case the reception of the picture by the system. According to another example, if the method is implemented in a shop or a beauty salon with the system 1 being remote from a camera located in the shop or beauty salon, the capture of the image is performed by said camera and then transmitted to the system 1. The acquisition step of the picture, by the system 1, is also in this case the reception of the picture by the system. Preferably, the picture of the face is acquired in a controlled lighting environment, with the subject being viewed from the front and at a fixed distance from the camera. The hair of the subject should be kept away from the zone of the face which has to be madeup. Moreover, the picture is preferably colorimetrically calibrated, according to methods known to the skilled person.

During a step 200, the face of the subject apparent on the acquired picture is preferably warped into a mean shape, which has preferably been computed before and may be stored in the memory 11. To perform this warping, the position of a number of characteristic points of the face may be acquired, and a transformation may be applied on the picture so that the position of the each characteristic point corresponds to the position of the same point according to said mean shape. One can for instance refer to the article by Goshtasby et al. "Piecewise linear mapping functions for image registration", 1986, for implementing this warping.

During a step 300, the computer 10 then performs a processing of the image to extract, for each of a plurality of spatial areas of each of a plurality of frequency ranges of the image, first color feature values of the spatial area. This step comprises a substep 310 of decomposing the image into a plurality of frequency ranges, to obtain a plurality of secondary images of the face of the subject in which each secondary image corresponds to one of the frequency ranges. This substep 310 is preferably performed by implementing a difference of Gaussians algorithm. According to this algorithm, noting I the image of the face of the subject and $G_\sigma$ a Gaussian kernel of standard deviation $\sigma$, two secondary images corresponding respectively to the high frequencies and low frequencies of the initial image are obtained by performing the following operations:

$HF=I-I*G_\sigma$ $LF=I*G_\sigma$ where HF corresponds to the secondary image in the high frequencies range, LF corresponds to the secondary image in the low frequencies range, and * denotes the convolution operator.

One can notice that the sum of LF and HF exactly corresponds to the initial image I.

This operation can be iterated recursively on each secondary image. In that case, another parameter $d\sigma$ has to be defined for each iteration from the second.

A decomposition of HF can be performed by computing:

$HF\_HF=HF-HF*G_{\sigma 21}$ $HF\_LF=HF*G_{\sigma 21}$ with HF_HF corresponding to the part of HF in the high frequencies range (of the range of frequencies covered by HF), HF_LF corresponding to the part of HF in the low frequencies range, and $\sigma 21=\sigma-d\sigma/2$.

A decomposition of LF can be performed by computing:

$LF\_HF=LF-LF*G_{\sigma 22}$ $LF\_LF=LF*G_{\sigma 22}$ with LF_HF corresponding to the part of LF in the high frequencies range (of the range of frequencies covered by LF), LF_LF corresponding to the part of LF in the low frequencies range, and $\sigma 22=+d\sigma/2$.

Figure 3:
FIG. 3 represents an example of a decomposition of an image into frequency ranges.

The decomposition of I then results in a set of four images {HF_HF, HF_LF, LF_HF, LF_LF}. The sum of the images results in I. This exemplary decomposition is shown in FIG. 3, with the highest frequency range on the left and the lower frequency range on the right. Of course, the decomposition may then be repeated to obtain successively 8, 16, etc., secondary images. According to this implementation, the number of secondary images is thus always a power of 2.

The frequency decomposition can be adjusted, for instance according to the type of makeup product which rendering has to be simulated.

Once the frequency decomposition 310 is achieved, each secondary image corresponding to a frequency range is then spatially decomposed during a substep 320 to obtain a plurality of spatial areas for each secondary image. To perform this step, a grid is superposed on each secondary image, the cells of the grid defining the spatial areas of the secondary image. Thus the spatial areas do not overlap and are arranged side by side such that any pixel of a secondary image belongs to a single spatial area.

In order to allow further computations, the same grid is applied, and at the same position, on all the secondary images, such that a spatial area of a secondary image corresponds to exactly the same part of the face of the subject that the corresponding spatial area on all the other secondary images.

Figure 4:
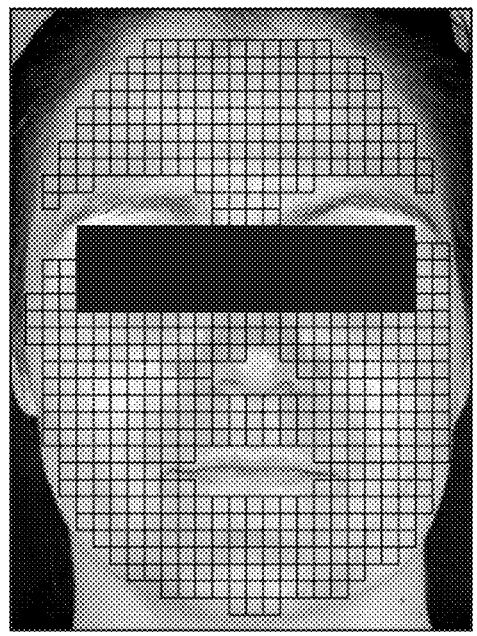
FIG. 4 represents an example of spatial decomposition of an image.

According to the type of makeup product which rendering has to be simulated, some of the spatial areas are then deleted in order only to keep spatial areas corresponding to zones of interest. With the example of foundation, the spatial areas corresponding to areas of the face comprising anything different from the skin to be madeup (ex. hair, eyebrows, mouth, eyes) are removed. An example of a set of spatial areas defined and selected for an application dedicated to rendering foundation is shown in FIG. 4. The size of the grid cells is also determined according to the type of makeup product which has to be simulated.

Step 300 then comprises a substep 330 of extracting, for each spatial area defined for each secondary image, first color feature values. The first color feature values are computed from the color parameters of each of the pixels of the spatial area. The color parameters of a pixel are, in the following example, RGB parameters, i.e. a red value, a green value and a blue value. Alternatively, the color parameters can be chosen in any other colorimetric system, such as the CIE L*a*b* color space.

The first color feature values of a spatial area are the mean and standard deviations values of the color parameters.

Hence for each spatial area in each secondary image, a vector is generated comprising the concatenation of all the mean and standard deviations values:

$$[\overline{RGB}\sigma_R\sigma_G\sigma_B]$$

A single description vector is then generated by concatenating the vectors generated for all the spatial areas of all the secondary images.

By means of illustration only, according to the example described above, if four secondary images are generated, and 350 spatial areas are kept for each secondary image, then a vector comprising 4*350*6=8400 parameters is obtained at the end of step 300.

The method then comprises a step 400 of determining, among the database of reference images, a set of reference individuals having, when wearing no makeup, color feature values similar to the first feature values of the subject. To this end, each image of the database is preferably stored in association with respective sets of color feature values which are computed the same way as disclosed above, i.e. each image of the database is processed according to steps 100 to 300, and with the same parameters.

For instance, the images are acquired and warped to a mean shape in the same conditions, the number of frequency ranges in which the images are decomposed is the same, and the number and size of spatial areas are the same as disclosed above.

Figure 7:
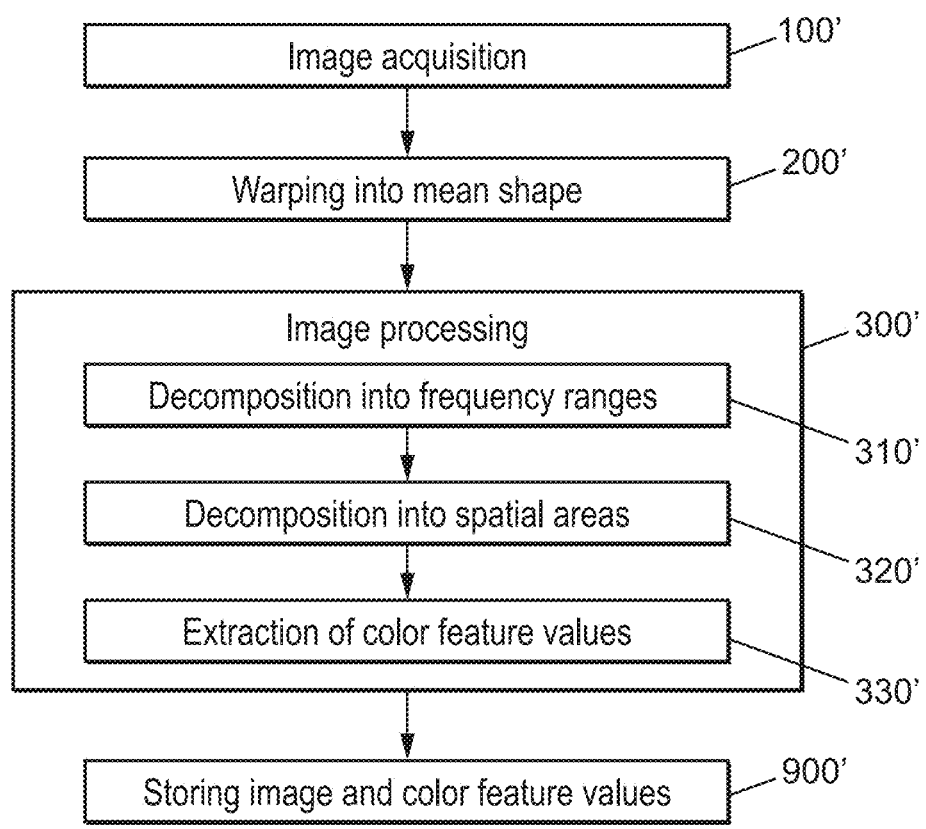
FIG. 7 schematically represents the main steps of a method of building the database of images.

According to a preferred embodiment, the processing of each image may be performed during the building of the database, by a computer which is not necessarily the same as the computer 10 implementing the method for simulating the rendering of the makeup product. This embodiment is preferred because in that case the color feature values of the reference images of the database are readily available. This embodiment is shown schematically in FIG. 7 which represents main steps of the building of the database, with step 100', 200', etc. corresponding respectively to the description of steps 100, 200, etc., but applied on the reference images instead of the image of the subject. Step 300 is followed by a step 900' of storing each acquired image in association with its corresponding color feature values.

Alternatively, the processing of each image of the database to extract the color feature values may also be performed by the computer 10 during implementation of the method for simulating the rendering of the makeup product.

The determination of the set of reference individuals having similar color feature values to those of the subject is performed by computing a distance, preferably an Euclidian distance, between the color feature values of the subject and those extracted from the pictures, without makeup, of each of the reference individuals of the database. Of course, if the database comprises pairs of images with and without makeup for a plurality of makeup products, only the reference individuals for which a pair of images exists for the makeup product to be simulated are selected.

The reference individuals for which the computed distances are the smallest are then selected. Alternatively, a number of reference individuals for which the computed distances are below a threshold are selected. The set of selected reference individuals comprises at least two reference individuals, for example between 2 and 10 reference individuals. As a preferred example the set comprises three reference individuals.

The method then comprises a step 500 of determining, from the first color feature values of the subject, and from the color feature values of the set of reference individuals with and without the makeup product, second color feature values of the subject, which correspond to the simulation of color feature values of the subject wearing the makeup product.

This step 500 comprises a first sub-step 510 of expressing the first color feature values of the subject as a centroid of the feature values of the reference individuals of the set, without makeup. For instance, if the set comprises three reference individuals, denoting P the first color feature values of the subject, and P1, P2 and P3 the color feature values of the reference individuals without makeup, substep 510 comprises the determination of weights A, B and C such that: P=A.P1+B.P2+C.P3.

The second color feature values of the subject are then determined during a substep 520 by considering that the relationship between the color feature values of the subject and the reference individuals remains the same once the makeup product is applied. Therefore, the second color feature values are computed as corresponding to the same centroid between the reference individuals as the one computed during sub-step 510.

Thus, denoting Q the second color feature values of the subject, and Q1, Q2 and Q3 the color feature values of the reference individuals of the set in the picture where they wear the makeup product to be simulated, then Q=A.Q1+B.Q2+C.Q3.

Figure 5:
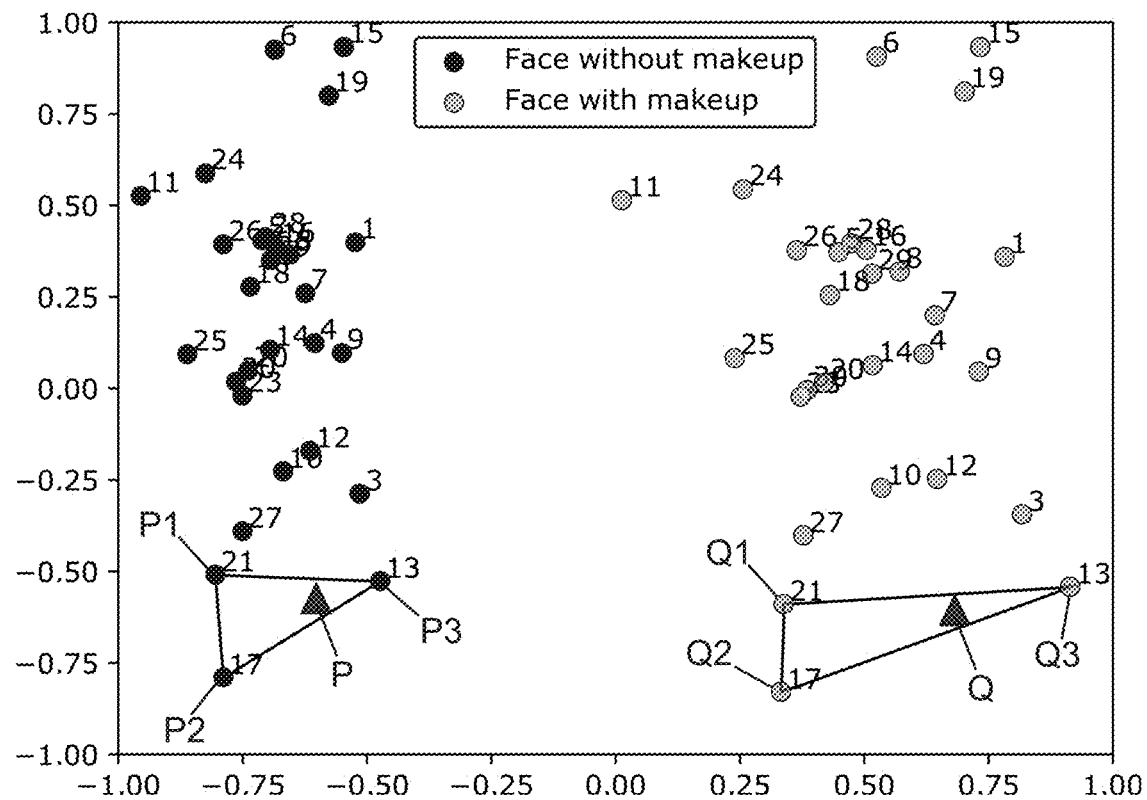
FIG. 5 represents an example of projection of the color feature values of the subject and reference individuals before and after application of makeup, the color feature values of the subjects after application of makeup being values obtained from the simulation method.

With reference to FIG. 5, an example is shown in which the color features values have been projected in a two-dimensional space for easier understanding. FIG. 5 show the respective positions of P, P1, P2, P3, Q1, Q2 and Q3, and the position of Q which is inferred from the same.

The method then comprises a step 600 of generating a modified image of the face based on the second color feature values. This step is performed by changing the values of the color parameter of the pixels of each spatial area of each frequency range so that the feature values of the modified pixels of the considered spatial area correspond to the second color feature values. According to an example, let Ri1 and Ri2 be respectively the red value of a pixel i of the picture of the subject without makeup and with makeup (simulated), $\overline{R}1$ and $\overline{R}2$ the average red value of the pixels of the spatial area comprising the pixel i without makeup, and with the makeup product, and σ1 and σ2 the standard deviation of the pixels of the same spatial area without and with makeup, then Ri2 can be computed as:

$$Ri2 = \left(\frac{Ri1 - \overline{R}1}{\sigma 1}\right) \cdot \sigma 2 + \overline{R}2$$

Once the color parameters of the pixels of each spatial area are modified, an image is rebuilt by summing all the secondary images corresponding to the frequency ranges in which the initial image has been decomposed. The obtained image is then warped back during step 700 to the shape of the face of the subject by an operation which is reversed relative to the operation performed on the initial image for warping this image to a mean shape of a face.

The modified image may then be stored in a memory. It is then preferably displayed during a step 800 by a display which can belong to the system, if for instance the system is located within the premises of a shop or beauty salon. Alternatively, the system 1 may send the modified image to a personal electronic device or to a shop or beauty salon, so that the modified image is then displayed by the display of the personal electronic device, or of the shop or beauty salon.

Figure 6A:
FIG. 6a illustrates an exemplary image of a person wearing no makeup.
Figure 6B:
FIG. 6b is a picture of the person of FIG. 6a wearing a foundation product.
Figure 6C:
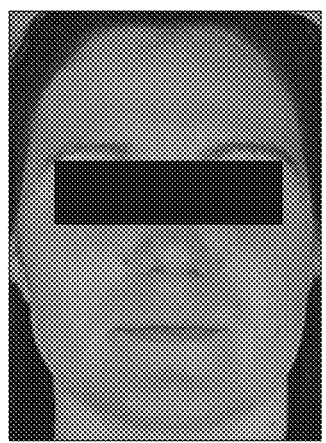
FIG. 6c represents a simulated picture of the person of FIG. 6a in which the rendering of the foundation product has been simulated.

FIGS. 6a to 6c show an exemplary application of the above-described method, wherein FIG. 6a is the original image of the subject without makeup, FIG. 6b is an actual picture of the subject wearing foundation, and FIG. 6c is the modified image in which the rendering of the same foundation product has been simulated according to the method disclosed above. One can notice a realistic rendering in FIG. 6c, very close to the actual rendering of FIG. 6b, in which spots such as beauty spots are greatly attenuated as compared to the initial image of FIG. 6a.

The invention claimed is:

1. A method for simulating the rendering of a make-up product on an image of a the face of a subject, the method being implemented by a system (1) comprising a computer (10) and a memory (11) storing a database of reference images comprising, for each of a plurality of reference individuals, an image of the face of the reference individual devoid of makeup and an image of the face of the same reference individual made up with the makeup product, the method comprising the steps of:
   a. acquiring (100) an image of the face of the subject devoid of makeup,
   b. processing (300) the image to extract, for each of a plurality of spatial areas of each of a plurality of spatial frequency ranges of the image, first color feature values of the spatial area,
   c. determining (400), among the database of reference images, a set comprising a plurality of reference individuals having, when wearing no makeup, color feature values in the corresponding spatial area similar to the first color feature values of the subject,
   d. determining (500), from the first color feature values of the subject, and from color feature values in the corresponding spatial area of the set of reference individuals with and without the makeup product, second color feature values, and
   e. generating (600) a modified image of the face of the subject based on the second color feature values.

2. The method according to claim 1, wherein step b. comprises:
   decomposing (310) the image of the face of the subject into a plurality of spatial frequency ranges, to obtain a plurality of secondary images wherein each secondary image corresponds to one of the spatial frequency ranges,
   performing (320) a spatial decomposition on each of the plurality of secondary images to obtain, for each secondary image, a plurality of spatial areas, and
   extracting (330) the first color feature values of each spatial area of each secondary image.

3. The method according to claim 2, wherein the decomposition (310) of the image of the face into a plurality of spatial frequency ranges is performed by difference of Gaussians.

4. The method according to claim 2,
   wherein each image comprises a plurality of pixels having color parameters, and the color feature values of a spatial area comprise an average value and a standard deviation of each color parameters of the pixels of the spatial area, and
   wherein step e. (600) comprises modifying the color parameters of each spatial area of each spatial frequency range so that each spatial area of each spatial frequency range exhibits the second color feature values, and replacing the color parameters of the pixels of the image of the subject by the sum of the modified color parameters over all the spatial frequency ranges.

5. The method according to claim 1, wherein each image comprises a plurality of pixels having color parameters, and the color feature values of a spatial area comprise an average value and a standard deviation of each color parameters of the pixels of the spatial area.

6. The method according to claim 5, wherein each image of the database is associated with color feature values determined by implementing, on the image, the processing of step b., and step c. (400) comprises computing a distance between the first color feature values of the subject and the color feature values of each image of a reference individual devoid of makeup, and selecting the reference individuals of the set as having the smallest computed distance with the subject.

7. The method according to claim 6, wherein step c. further comprises a preliminary step of associating color feature values to each image of the database by implementing, on the image, the processing of step b.

8. The method according to claim 6, wherein step d. (500) comprises expressing (510) the first color feature values of the subject as a centroid of the feature values of the set of reference individuals without makeup, and determining (520) the second feature values as the same centroid of the feature values of the set of reference individuals wearing the makeup.

9. The method according to claim 1, comprising a step (200) prior to step b. of warping the acquired image of the face of the subject into a mean shape, and a step (700) following step e. (600) of warping the generated modified image back to the initial shape of the face of the subject.

10. A system (1) for simulating the rendering of a makeup product on an image of the face of a subject, comprising a computer (10) and a memory (11) storing a database of reference images comprising, for each of a plurality of reference individuals, an image of the face of the reference individual devoid of makeup and an image of the face of the same reference individual madeup with the makeup product, the system being configured for implementing the method according to claim 1.

11. A non-transitory computer-readable medium on which is stored a computer program including code instructions to implement, when executed by a computer, a method for simulating rendering of a makeup product on an image of a face of a subject, the method being implemented by a system including the computer and a memory storing a database of reference images including, for each of a plurality of reference individuals, an image of the face of the reference individual devoid of makeup and an image of the face of the same reference individual made up with the makeup product, the method comprising:
   acquiring an image of the face of the subject devoid of makeup;
   processing the image to extract, for each of a plurality of spatial areas of each of a plurality of spatial frequency ranges of the image, first color feature values of the spatial area;
   determining, among the database of reference images, a set comprising a plurality of reference individuals having, when wearing no makeup, color feature values in the corresponding spatial area similar to the first color feature values of the subject;
   determining, from the first color feature values of the subject and color feature values in the corresponding spatial area of the set of reference individuals with and without the makeup product, second color feature values; and generating a modified image of the face of the subject based on the determined second color feature values.

12. A method for building a database of reference images, the method being implemented by a computer, the method comprising:

acquiring, for each of a plurality of reference individuals, an image of the face of the reference individual devoid of makeup and an image of the face of the same reference individual made up with the makeup product;

processing each of the images to extract, for each of a plurality of spatial areas of each of a plurality of spatial frequency ranges of the image, color feature values of the respective spatial area, the processing comprising decomposing the image of the face of the subject into a plurality of spatial frequency ranges, to obtain a plurality of secondary images, each of the secondary images corresponding to one of the spatial frequency ranges, performing a spatial decomposition on each of the plurality of secondary images to obtain, for each of the secondary images, a plurality of spatial areas, and extracting the first color feature values of each of the spatial areas of each of the secondary images; and storing, in a memory, each of the images in association with the color feature values extracted from the image.

13. A method for building a database of reference images, the method being implemented by a computer, the method comprising:

acquiring, for each of a plurality of reference individuals, an image of the face of the reference individual devoid of makeup and an image of the face of the same reference individual made up with the makeup product;

processing each of the images to extract, for each of a plurality of spatial areas of each of a plurality of spatial frequency ranges of the image, color feature values of the respective spatial area; and storing, in a memory, each of the images in association with the color feature values extracted from the image, wherein each of the images comprises a plurality of pixels having color parameters, and the color feature values of the respective spatial area comprise an average value and a standard deviation of each color parameter of the pixels of the respective spatial area.

14. A non-transitory computer-readable medium on which is stored a computer program including code instructions to implement, when executed by a computer, a method for building a database of reference images, the method comprising:

acquiring, for each of a plurality of reference individuals, an image of the face of the reference individual devoid of makeup and an image of the face of the same reference individual made up with the makeup product;

processing each of the images to extract, for each of a plurality of spatial areas of each of a plurality of spatial frequency ranges of the image, color feature values of the respective spatial area; and storing, in a memory, each of the images in association with the color feature values extracted from the image.

* * * * *